United States Patent
Miyashita et al.

(10) Patent No.: US 9,662,711 B2
(45) Date of Patent: May 30, 2017

(54) CUTTING TOOL MADE OF CUBIC BORON NITRIDE-BASED SINTERED MATERIAL

(71) Applicant: MITSUBISHI MATERIALS CORPORATION, Tokyo (JP)

(72) Inventors: Yosuke Miyashita, Naka (JP); Masahiro Yano, Naka (JP); Tadakazu Ohashi, Mito (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 242 days.

(21) Appl. No.: 14/400,980

(22) PCT Filed: Mar. 26, 2013

(86) PCT No.: PCT/JP2013/058778
§ 371 (c)(1),
(2) Date: Nov. 13, 2014

(87) PCT Pub. No.: WO2013/172095
PCT Pub. Date: Nov. 21, 2013

(65) Prior Publication Data
US 2015/0132076 A1    May 14, 2015

(30) Foreign Application Priority Data

May 16, 2012 (JP) ................................. 2012-112492
Mar. 22, 2013 (JP) ................................. 2013-060098

(51) Int. Cl.
*B23B 27/14* (2006.01)
*C04B 35/5831* (2006.01)
(Continued)

(52) U.S. Cl.
CPC .......... *B23B 27/14* (2013.01); *C04B 35/5831* (2013.01); *C04B 35/62813* (2013.01);
(Continued)

(58) Field of Classification Search
CPC .............. B23B 27/14; B23B 2226/125; C04B 35/5831; C04B 35/62813;
(Continued)

(56) References Cited

FOREIGN PATENT DOCUMENTS

| CN | 1242350 A | 1/2000 |
|---|---|---|
| CN | 101537501 A | 9/2009 |

(Continued)

OTHER PUBLICATIONS

Office Action mailed Sep. 25, 2015 for the corresponding Chinese Application No. 201380025431.7.

(Continued)

*Primary Examiner* — Sunil K Singh
*Assistant Examiner* — Alan Snyder
(74) *Attorney, Agent, or Firm* — Leason Ellis LLP

(57) ABSTRACT

A cBN tool that exhibits: excellent chipping resistance and wear resistance; and excellent cutting performance, for a long term use even in intermittent cutting work on high hardened steel is provided. The cutting tool includes a cutting tool body that is a cubic boron nitride-based material containing cubic boron nitride particles as a hard phase component. In the cutting tool, the cubic boron nitride particles includes an $Al_2O_3$ layer with an average layer thickness of 1.0-10 nm on a surface of the cubic boron nitride particles, a rift with an average rift formation ratio of 0.02-0.20 being formed in the $Al_2O_3$ layer, and the cubic boron nitride-based sintered material includes a binding phase containing at least one selected from a group consisting of: titanium nitride; titanium carbide; titanium carbonitride; titanium boride; aluminum nitride; aluminum oxide; inevitable products; and mutual solid solution thereof, around the cubic boron nitride particles.

6 Claims, 2 Drawing Sheets

(51) Int. Cl.
   *C04B 35/628*    (2006.01)
   *C04B 35/63*     (2006.01)
   *C04B 35/645*    (2006.01)
   *C04B 37/02*     (2006.01)
   *C04B 35/64*     (2006.01)

(52) U.S. Cl.
   CPC .. *C04B 35/62836* (2013.01); *C04B 35/62884* (2013.01); *C04B 35/62889* (2013.01); *C04B 35/62894* (2013.01); *C04B 35/62897* (2013.01); *C04B 35/6303* (2013.01); *C04B 35/64* (2013.01); *C04B 35/645* (2013.01); *C04B 37/026* (2013.01); *B23B 2226/125* (2013.01); *C04B 2235/3217* (2013.01); *C04B 2235/3804* (2013.01); *C04B 2235/386* (2013.01); *C04B 2235/3813* (2013.01); *C04B 2235/3843* (2013.01); *C04B 2235/3847* (2013.01); *C04B 2235/3856* (2013.01); *C04B 2235/3865* (2013.01); *C04B 2235/3886* (2013.01); *C04B 2235/402* (2013.01); *C04B 2235/404* (2013.01); *C04B 2235/5436* (2013.01); *C04B 2235/5445* (2013.01); *C04B 2235/80* (2013.01); *C04B 2235/96* (2013.01); *C04B 2237/125* (2013.01); *C04B 2237/126* (2013.01); *C04B 2237/127* (2013.01); *C04B 2237/361* (2013.01); *C04B 2237/401* (2013.01); *Y10T 407/27* (2015.01)

(58) Field of Classification Search
   CPC ........ C04B 35/62836; C04B 35/62884; C04B 35/62889; C04B 35/62894; C04B 35/62897; C04B 2235/3217
   USPC .......................................................... 428/216
   See application file for complete search history.

(56) References Cited

FOREIGN PATENT DOCUMENTS

| | | | |
|---|---|---|---|
| EP | 2752265 | A | 7/2014 |
| GB | 1593770 | A | 7/1981 |
| JP | 53-077811 | A | 7/1978 |
| JP | 53-139609 | A | 12/1978 |
| JP | 05-051267 | A | 3/1993 |
| JP | 08-081271 | A | 3/1996 |
| JP | 08-239277 | A | 9/1996 |
| JP | 2000-044347 | A | 2/2000 |
| JP | 2011-183524 | A | 9/2011 |
| JP | 2011-212832 | A | 10/2011 |
| WO | WO-2011/059020 | A | 5/2011 |

OTHER PUBLICATIONS

Extended European Search Report mailed Nov. 19, 2015 for the corresponding European Application No. 13790213.6.
International Search Report mailed Jun. 4, 2013 for the corresponding PCT Application No. PCT/JP2013/058778.
Notice of Allowance mailed May 29, 2013 for the corresponding Japanese Application No. 2013-060098.

CUTTING TOOL MADE OF CUBIC BORON NITRIDE-BASED SINTERED MATERIAL

CROSS-REFERENCE TO RELATED PATENT APPLICATIONS

This application is a U.S. National Phase Application under 35 U.S.C. §371 of International Patent Application No. PCT/JP2013/058778, filed Mar. 26, 2013, and claims the benefit of Japanese Patent Applications No. 2012-112492, filed on May 16, 2012, and No. 2013-060098, filed Mar. 22, 2013, all of which are incorporated by reference in their entirety herein. The International Application was published in Japanese on Nov. 21, 2013 as International Publication No. WO/2013/172095 under PCT Article 21(2).

FIELD OF THE INVENTION

The present invention relates to a cutting tool made of cubic boron nitride (hereinafter indicated as cBN) based sintered material (hereinafter, referred to as a cBN tool).

BACKGROUND OF THE INVENTION

Conventionally, the cBN cutting tool, which uses the cBN-based sintered material (hereinafter referred as cBN sintered compact) as its tool material with a low affinity to the workpiece, is known in cutting work on a ferrous workpiece such as steel, casted iron, or the like. For example, as shown in Patent Literature 1 (PTL 1), a cBN cutting tool, which contains: cBN in 40 to 80 volume % as the hard phase; and the balance of the ceramics compound such as carbides, nitrides, borides, or the like of elements belonging to 4a, 5a, 6a groups in the periodic table as the binding phase, is known. Also, as shown in Patent Literature 2 (PTL 2), a cBN cutting tool is proposed. In the cutting tool disclosed in PTL 2, the cutting tool body of the cBN cutting tool is a sintered body produced by using cBN particles coated uniformly by $Al_2O_3$ layers without a rift on the surfaces of the cBN particles as a raw material powder. It is known that by using the cBN cutting tool, the crater wear resistance and the chipping resistance of the cutting tool are improved.

RELATED ART DOCUMENTS

Patent Literature

PTL 1: Japanese Unexamined Patent Application, First Publication No. S53-77811 (A)
PTL 2: Japanese Unexamined Patent Application, First Publication No. 2011-183524 (A)

Problems to be Solved by the Present Invention

In the conventionally known cBN cutting tool disclosed in PTL 2, the cBN sintered material is produced by using cBN particles coated by $Al_2O_3$ layers as raw a material powder in advance. Because of this, the cBN is not directly exposed on the surface of the rake face when the cBN sintered material is used as the cutting tool body. Having the cBN not being exposed on the surface of the rake face contributes to improvement of wear resistance. However, in this case, residual stress is generated due to difference of thermal expansion characteristics between the cBN and the $Al_2O_3$ layer. Thus, when the cBN cutting tool is used on intermittent cutting of high hardened steel, the service life of the cutting tool becomes short-lived since its chipping resistance and fracturing resistance are not sufficient.

Under the circumstances described above, the technical problem to be solved by the present invention, which is the purpose of the present invention, is to provide a cBN cutting tool that exhibits excellent chipping resistance and fracturing resistance in the intermittent cutting work on high hardened steel. In addition, the cBN cutting tool related to the present invention exhibits an excellent cutting performance for a long-term usage.

Means to Solving the Problems

In order to overcome the above-described problem, the inventors of the present invention conducted an intensive study, focusing on the cBN particles that are the hard phase component of the cBN cutting tool. Then they obtained findings described below.

In the cBN sintered compact of the conventional cBN cutting tool disclosed in PTL 2, the coated-cBN particles, which are coated by the $Al_2O_3$ layer on their surfaces in advance, are used as the raw material powder. The cBN sintered material is produced by sintering under the ultra-high-pressure and high-temperature condition in which pressure and temperature are set to 5 GPa and 1500° C., respectively, after mixing the raw material power with the binding phase powder and preforming. The residual tensile stress is formed to the $Al_2O_3$ layer coated on the surfaces of the cBN particles due to the difference of their thermal expansion characteristics.

When the cBN cutting tool is applied to the intermittent cutting on high hardened steel, the phenomenon explained below was observed. That is, cracks are formed particularly on the boundaries between the $Al_2O_3$ layer and cBN particle exposed on the surface of the rake face due to the intermittent and impacting load during cutting and the residual tensile stress mentioned above. Then, making the cracks origins, chipping and fracturing occur.

Under the circumstance described above, the inventors of the present invention intended to improve the performance of the cutting tool by preventing chipping formation and fracturing formation because of the cracks, by forming an $Al_2O_3$ layer with a rift on the surface of the cBN particle partially to suppress crack formation by the tensile stress in the boundaries due to the difference of thermal tension characteristics between the surface of the cBN particle and the $Al_2O_3$ layer coated on the cBN particle.

SUMMARY OF THE INVENTION

The present invention is made based on the finding described above, and has aspects shown below.

(1) A cutting tool made of a cubic boron nitride-based sintered material including a cutting tool body that is a cubic boron nitride-based material containing at least cubic boron nitride particles as a hard phase component, wherein
each of the cubic boron nitride particles includes an $Al_2O_3$ layer with an average layer thickness of 1.0-10 nm on a surface of the each of the cubic boron nitride particles, a rift with an average rift formation ratio of 0.02-0.20 being formed in the $Al_2O_3$ layer, and
the cubic boron nitride-based sintered material includes a binding phase containing at least one selected from a group consisting of: titanium nitride; titanium carbide; titanium carbonitride; titanium boride; aluminum nitride; aluminum oxide; inevitable products; and mutual solid solution thereof, around the each of cubic boron nitride particles.

(2) The cutting tool made of a cubic boron nitride-based material according to (1) described above, wherein in a case where a volume of a region 50 nm from the surface of the each of the cubic boron nitride particles toward an outside of the each of the cubic boron nitride particles is defined as 100 volume %, a total content of $Al_2O_3$ formed on the surface of the each of the cubic boron nitride particles and $Al_2O_3$ existing in the binding phase included in the region is 2-40 volume %.

(3) The cutting tool made of a cubic boron nitride-based material according to (1) or (2) described above, wherein an average grain size of the cubic boron nitride particles is 0.5-8 μm.

(4) The cutting tool made of a cubic boron nitride-based material according to any one of (1) to (3) described above, wherein a TiN layer with an average layer thickness of 10-100 nm is formed on the $Al_2O_3$ layer.

(5) The cutting tool made of a cubic boron nitride-based material according to any one of (1) to (4) described above, wherein the rift formed in the $Al_2O_3$ layer is formed by: inserting the cubic boron nitride particles, on each of which the $Al_2O_3$ layer is formed, in a container made of cemented carbide; and performing ball-mill mixing in a presence of cemented carbide balls.

(6) The cutting tool made of a cubic boron nitride-based material according to any one of (1) to (5), wherein a content ratio of the cubic boron nitride particles relative to an entire cubic boron nitride-based sintered material is 50-80 volume %.

(7) A method of producing a cutting tool made of a cubic boron nitride-based material, the method including the steps of:

forming an $Al_2O_3$ layer with an average layer thickness of 1.0-10 nm on each of cubic boron nitride particles;

introducing a rift with an average rift formation ratio of 0.02-0.20 in the $Al_2O_3$ layer; and sintering a mixed powder containing the cubic boron nitride particles coated with the $Al_2O_3$ layer in which the rift is introduced to obtain the cubic boron nitride-based material.

(8) The method of producing a cutting tool made of a cubic boron nitride-based sintered material according to (7) described above, wherein the step of introducing a rift includes the steps of:

inserting the cubic boron nitride particles in a container made of cemented carbide; and performing ball-mill mixing in a presence of cemented carbide balls.

(9) The method of producing a cutting tool made of a cubic boron nitride-based sintered material according to (7) or (8) described above, wherein formation of the $Al_2O_3$ layer in the step of forming an $Al_2O_3$ layer is performed by ALD method.

(10) The method of producing a cutting tool made of a cubic boron nitride-based sintered material according to any one of (7) to (9) described above, the method further includes the step of forming a TiN layer on the cubic boron nitride particles after the step of forming an $Al_2O_3$ layer.

(11) The method of producing a cutting tool made of a cubic boron nitride-based material according to any one of (7) to (10), wherein a content ratio of the cubic boron nitride particles relative to an entire cubic boron nitride-based sintered material is 50-80 volume %.

Effects of the Invention

The cBN tool of an aspect of the present invention (hereinafter referred as the cBN tool of the present invention) is a cutting tool made of a cubic boron nitride-based sintered material including a cutting tool body that is a cubic boron nitride-based material containing at least cubic boron nitride particles as a hard phase component. Each of the cubic boron nitride particles includes an $Al_2O_3$ layer with an average layer thickness of 1.0-10 nm on a surface of the each of the cubic boron nitride particles, a rift with an average rift formation ratio of 0.02-0.20 being formed in the $Al_2O_3$ layer. The cubic boron nitride-based sintered material includes a binding phase containing at least one selected from a group consisting of: titanium nitride; titanium carbide; titanium carbonitride; titanium boride; aluminum nitride; aluminum oxide; inevitable products; and mutual solid solution thereof, around the each of cubic boron nitride particles. Also, the content ratio of the cubic boron nitride particles relative to an entire cubic boron nitride-based sintered material is 50-80 volume %. By having the configurations, the sintered material becomes the sintered material in which crack formation is reduced; fracturing resistance is increased; and toughness is increased.

In addition, in the case where the volume of a region 50 nm from the surface of the each of the cubic boron nitride particles toward an outside of the each of the cubic boron nitride particles is defined as 100 volume %, the total content of $Al_2O_3$ formed on the surface of the each of the cubic boron nitride particles and $Al_2O_3$ existing in the binding phase in the region is 2-40 volume %. By having the configuration, formation of $Al_2O_3$ in the vicinity of the cBN particles during sintering can be suppressed. Thus, excellent chipping resistance and fracturing resistance can be obtained by having the texture in which the content amount of the binding phase made of titanium nitride or the like is increased in the vicinity of the cBN particles, while retaining sufficient interface strength. Moreover, by reducing the amount of $Al_2O_3$ in the vicinity of the cBN particles, the cBN particle holding force by the binding phase made of titanium nitride or the like can be strengthened; and progress of fracturing due to detachment of a cBN particle can be suppressed.

In addition, by the method of producing a cutting tool made of a cubic boron nitride-based sintered material, the method being other aspect of the present invention (hereinafter referred as the cBN cutting tool producing method of the present invention), the above-described cBN tool of the present invention can be produced efficiently.

DETAILED DESCRIPTION OF THE INVENTION

Figure 1:
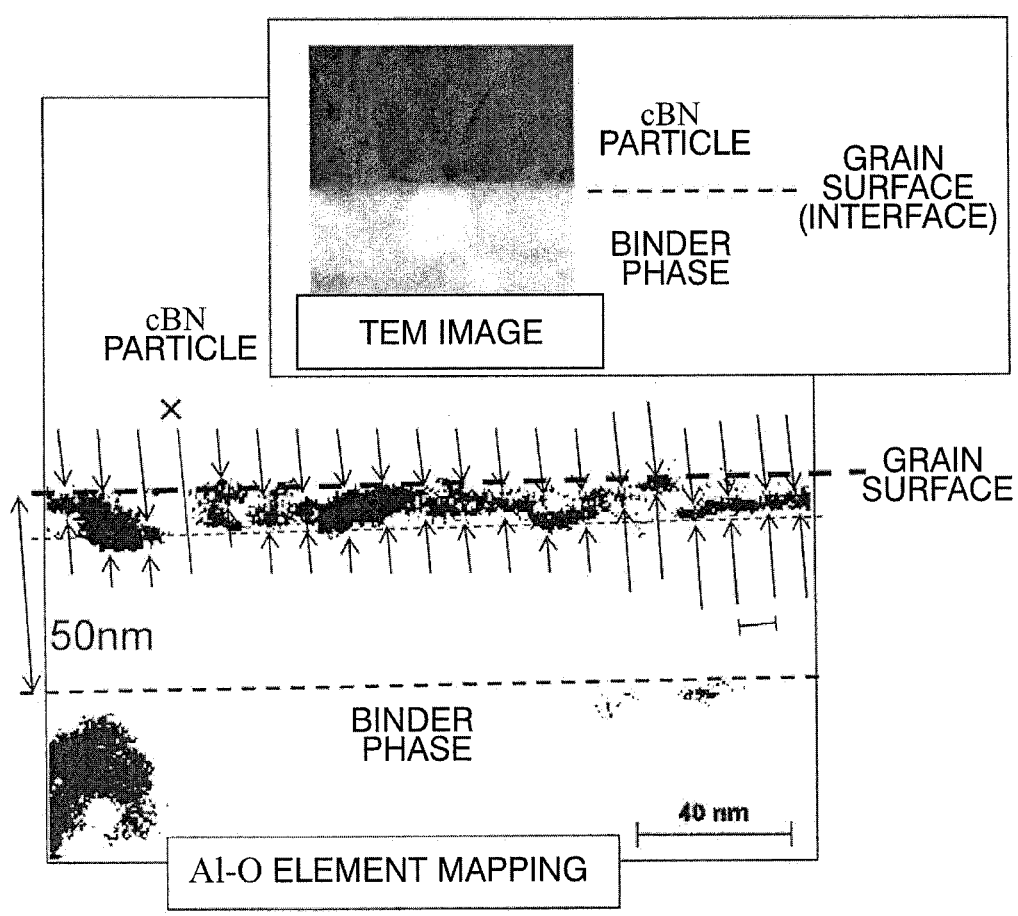
FIG. 1 is a cross-sectional image of the cBN particle including an $Al_2O_3$ layer, which was used for measurement of the rift formation ratio and had the average layer thickness of 6.0 nm.

Best Mode for Carrying Out the Invention

The cBN particle included in the cutting tool body of the cBN tool, which is an embodiment of the present invention, is coated by an extremely thin aluminum oxide layer whose average layer thickness is 1.0-10 nm. The aluminum oxide layer can be formed by ALD (Atomic Layer Deposition) method. ALD method is a type of CVD method. In ALD method, a layer is deposited by reacting molecules of raw material compounds per a layer on the substrate in a vacuum chamber and repeating purges of the raw material compounds, such as Ar and nitrogen.

In addition, a TiN layer, which is formed on the outer side of the aluminum oxide layer if necessary, can be formed by the above-described ALD method.

Formation of the aluminum oxide layer and the TiN layer by ALD method is explained below.

The $Al_2O_3$ layer with the average layer thickness of 10 nm is coated on the surfaces of the cBN particles as explained below. The cBN particles are inserted into a furnace and the temperature in the furnace is raised to about 350° C. Then, a cycle is repeated multiple times until an intended layer thickness is obtained using the $Al(CH_3)_3$ gas, which is the precursor of Al and the $H_2O$ gas as a reaction gas. In one set of the cycle, (1) Ar+$Al(CH_3)_3$ gas introducing process; (2) Ar gas purging process; (3) Ar+$H_2O$ gas introducing process; and (4) Ar gas purging process, are performed sequentially. For example, the $Al_2O_3$ layer is deposited by performing the process described above for 1 hour. After the formation of the $Al_2O_3$ layer, the TiN layer is deposited by ALD method in the same manner on the $Al_2O_3$ layer coated on the surfaces of the cBN particles In order to deposit the TiN layer on the $Al_2O_3$ layer by ALD method, the cBN particles are inserted into a furnace and the temperature in the furnace is raised to 400° C. Then, a cycle is repeated multiple times until an intended layer thickness is obtained using $TiCl_4$ gas and $NH_3$ gas as the raw material gases. In one set of the cycle, (1) Ar+$TiCl_4$ gas introducing process; (2) Ar gas purging process; (3) Ar+$NH_3$ gas introducing process; and (4) Ar gas purging process, are performed sequentially.

Next, a partial rift is formed in the $Al_2O_3$ layer of the cBN particles on which the TiN layer is deposited to produce the cBN particles whose surfaces are exposed in the rift parts by mixing and agitating the cBN particles with a ball mill for 0.25-3.0 hours.

In this process, if the layer thickness of the TiN layer deposited on the $Al_2O_3$ layer were too thin, the cBN particle holding force by the binding phase would decrease since the amount of $Al_2O_3$, which irreversibly formed in the vicinity of the surfaces of the cBN particles in the cBN sintered materials produced by the ultra-high pressure and temperature treatment, increases. Thus, detachment of the cBN particle proceeds readily during cutting. On the other hand, if the layer thickness of the TiN layer deposited on the $Al_2O_3$ layer were too thick, the amount of $Al_2O_3$ irreversibly formed in the vicinity of the surfaces of the cBN particles would decrease. Furthermore, the amounts of reaction products, such as MN, $TiB_2$, and the like, would be reduced in the ultra-high pressure and temperature treatment. Thus, the sintering reaction in the vicinity of the surfaces of the cBN particles does not proceed sufficiently, and hardness of the cBN sintered material reduces.

Because of the reasons described above, the amount of $Al_2O_3$ in the vicinity of the surfaces of the cBN particles is set within a predetermined range by regulating the layer thickness of the TiN layer within a predetermined range. More specifically, it is found that a preferable total content ratio of $Al_2O_3$ formed in the surfaces of the cBN particles; and $Al_2O_3$, which is an inevitable product existing in the binding phase, is 2-40 volume %, in the case where the volume of region 50 nm from the surface of the cBN particle is defined 100 volume %. The volume % of $Al_2O_3$ can be obtained as area % in the binarized image which is obtained from TEM (Transmission Electron Microscopy) image.

The cBN particles prepared as described above and raw material powders, which are selected from the group consisting of: the TiN powder; the TiC powder; the TiCN powder; the $TiAl_3$ powder; the Al powder; the $Al_2O_3$ powder; and the binding phase raw material of the WC powder, are wet-mixed uniformly. Then, after drying the obtained mixed powder, it is molded at the molding pressure of 1 MPa by a hydraulic press. Next, the molded body is heat treated in the condition of 1 Pa of vacuum at 1000° C. for 30 minutes to be degassed. Then, the molded body is stacked with a cemented carbide substrate and treated in an ultra-high pressure and temperature condition, such as pressure of 5.5 GPa, temperature of 1400° C., and the retention time of 30 minutes to obtain the cBN sintered material. In the cBN tool produced from the cBN sintered material obtained as explained above, cracking formation is suppressed even in high-load cutting; chipping and fracturing resistances are excellent. As a result, the cBN tool exhibits excellent cutting performance for a long-term usage.

In other words, the crack formation is suppressed in the interface due to the thermal expansion characteristics difference between the surface of the cBN particle and the $Al_2O_3$ layer coated on the surface of the particle in the cBN tool, since the surface of the cBN particle is coated by the $Al_2O_3$ layer with the rift partially. Thus, the chipping formation and fracturing formation due to the cracking are prevented.

In addition, by depositing the TiN layer on the $Al_2O_3$ layer on the surface of the cBN particle, the formation of $Al_2O_3$ irreversibly formed in the vicinity of the cBN particles during sintering can be suppressed. Thus, the structure with an increased content of TiN or the like can be obtained in the vicinity of the cBN particles, while retaining sufficient interface strength. As a result, excellent chipping and fracturing resistances can be obtained.

Furthermore, by reducing the amount of $Al_2O_3$ in the vicinity of the cBN particles, the cBN particle holding force by the binding phase, which is made of titanium nitride; titanium carbide; titanium carbonitride: titanium boride; aluminum nitride; aluminum oxide; inevitable products; and a mutual solid solution thereof, can be increased, and the progress of fracturing due to the detachment of the cBN particles can be suppressed.

Components constituting the cBN tool of an embodiment of the present invention are explained in detail below.

cBN Sintered Material:

cBN sintered materials are made of the hard phase component and the binding phase normally. However, the cBN sintered material, which is the cutting tool body of the cBN tool of the present invention, includes the cBN particles, which are coated by the $Al_2O_3$ layers, as the hard phase component. Furthermore, a rift is formed partially to the $Al_2O_3$ layer by kneading the cBN particles by a ball mill in the state where the TiN layer is formed on the $Al_2O_3$ layer.

That is, the crack formation due to the difference of thermal expansion characteristics in the interface, which is tend to be generated normally when the surface of a cBN particle is coated by an $Al_2O_3$ layer, is suppressed since surfaces of the cBN particles are coated by the $Al_2O_3$ layer in which the rift if formed partially.

In addition, irreversible formation of $Al_2O_3$ in the vicinity of the cBN particles during sintering can be suppressed by regulating the layer thickness of the TiN layer formed on the $Al_2O_3$ layer. Thus, the structure with an increased content of the binding phase component, such as titanium nitride; titanium carbonate; titanium carbonitride; titanium boride; and the like, can be obtained in the vicinity of the cBN particles. As a result, the cBN tool with excellent chipping and fracturing resistances can be obtained.

Moreover, the amount of $Al_2O_3$ formation originated from the Al components or the like in the binding phase during sintering can be reduced in the vicinity of the surfaces of the cBN particles, since the cBN particles are sintered in the state where the cBN particles are coated by the TiN layers. Thus, the cBN particle holding force by the binding phase can be increased, and the progress of fracturing due to detachment of cBN particles can be suppressed.

Average Grain Size of cBN Particles:

The average grain size of the cBN particles used in the present invention is not particularly limited in terms of the technical effect of the present invention. However, it is preferable that the average grain size of the cBN particles is within the range from 0.5-8 μm By including the hard cBN particles in the sintered material, fracturing resistance is improved. In addition, by having the cBN particles with the average grain size of 0.5 μm-8 μm dispersed in the sintered material, chipping originated from the protruding and recessed shapes in the cutting edge, which are formed by detaching of the cBN particles on the tool surface during usage of the tool, is suppressed. In addition, propagation of the cracks, which are formed by the stress loaded on the cutting edge during usage of the tool and develop from the interface between the cBN particle and the binding phase, or the cracks, which develop after splitting of the cBN particle, is suppressed by the cBN particles dispersed in the sintered material. Because of these, the cBN tool can obtain excellent fracturing resistance.

Therefore, in order to exhibit the technical effect of the present invention even at a higher level, it is preferable that the average grain size of the cBN particles is set within the range of 0.5-8 μm.

Content Ratio of cBN Particles Relative to the cBN Sintered Material:

The content ratio of the cBN particles relative to the cBN sintered material is not particularly limited in terms of the technical effect of the present invention. However, if it were less than 50 volume %, hard materials in the sintered material would become scarce, lowering fracturing resistance when it is used as a tool. On the other hand, if it exceeded 80 volume %, the voids that become the origin of cracks would be formed in the sintered material, lowering the fracturing resistance. Thus, in order to exhibit the technical effect of the present invention even at a higher level, it is preferable that the content ratio of the cBN particles relative to the cBN sintered material is set within the range of 50-80 volume %.

The content ratio of cBN particles (volume %) relative to the cBN sintered material is defined as the area ratio of the area occupied by the cBN particles in the image analysis in the case where: the sectional structure of the cBN sintered material is observed by SEM (Scanning Electron Microscopy) in the visual field area of about 15 μm×15 μm; and the parts corresponding to the cBN particles in the obtained secondary electron image are extracted by image processing.

Producing cBN Particles on which the Coating Layer is Formed by the $Al_2O_3$ Layer with the Rift:

The cBN particles, on which the coating layer is formed by the $Al_2O_3$ layer with the partial rift, can be produced, for example, by following the processes (I)-(III) described below.

Process (I):

First, a thin-layered $Al_2O_3$ layer is formed on the surfaces of the cBN particles by ALD method. The thin-layered $Al_2O_3$ layer can be formed without initiating aggregation of cBN particles since the $Al_2O_3$ layer can be formed on the surface of the cBN particle one layer at a time in ALD method.

More specifically, the $Al_2O_3$ layer with the layer thickness of 10 nm can be formed on the surface of the cBN particle for example by: inserting cBN particles with the average grain size of 0.5-8 μm in the furnace; increasing temperature in the furnace to about 350° C.; and repeating a cycle of: (1) $Ar+Al(CH_3)_3$ gas introducing process; (2) Ar gas purging process; (3) $Ar+H_2O$ gas introducing process; and (4) Ar gas purging process, until the intended layer thickness is obtained, for example by performing the repetition to form the layer for 1 hour.

Formation of the $Al_2O_3$ layer without a rift on the surface of the cBN particle is confirmed by observing the cross section of the cBN particle by TEM after polishing the cross section of the cBN particle obtained as described above and thin slicing using FIB (Focused Ion Beam)

Process (II):

Next, a TiN layer is formed on the $Al_2O_3$ layer by ALD method.

In order to form the TiN layer on the $Al_2O_3$ layer by ALD method, cBN particles are inserted in the furnace, and the temperature in the furnace is increased to 400° C. Then, a cycle of: (1) $Ar+TiCl_4$ gas introducing process; (2) Ar gas purging process; (3) $Ar+NH_3$ gas introducing process; and (4) Ar gas purging process, is repeated using $TiCl_4$ gas and $NH_3$ gas as raw material gases until the thickness of the TiN layer reaches to the intended layer thickness (10-100 nm) to obtain the TiN layer with the intended layer thickness.

Process (III):

Next, the cBN particles that the TiN layers are formed on their $Al_2O_3$ layers are inserted in a container made of cemented carbide and ball-mixing is performed in the presence of the cemented carbide balls (for example, diameter of 1 mm) for 0.25-3.0 hours. By performing the procedures described above, the cBN particles, which are coated by the $Al_2O_3$ layers with the partially formed rifts and a predetermined average layer thickness, can be produced.

There are two reasons for producing the cBN particles coated by the $Al_2O_3$ layer without a rift in the process (I). One is to make it possible to control the average layer thickness of the $Al_2O_3$ layer to the intended value in the following process (II). Another is to make it possible to control the formation ratio of the rift formed along with the surface of the cBN particle in the $Al_2O_3$ layer to the intended value in a similar fashion.

Process (IV):

Producing the cBN Sintered Material:

1) The TiN powder, the TiC powder, the TiCN powder, the $TiAl_3$ powder, the Al powder, $Al_2O_3$ powder, and the WC powder are provided as the raw material powders for binder material.

2) The cBN particles, which are obtained in the above-described process (III) and coated by: the $Al_2O_3$ layer on which the rift is formed partially; and the TiN layer, and the material powders selected from the above-described raw material powders for binder material, are weighted to obtain the predetermined composition ratio, and wet-mixed uniformly in a container made of cemented carbide.

3) After drying the obtained mixed powders, the dried mixed powders are molded by a hydraulic press at a molding pressure of 1 MPa in the same condition to obtain the molded material.

4) The molded material is subjected to heat treatment in the condition of: 1 Pa or less of vacuum; 1000° C. of temperature; and 30 minutes of the retention time. Then, the molded material is degassed.

5) The molded material is stacked with a cemented carbide alloy substrate and subjected to an ultra-high pressure and temperature treatment in the condition of: 5.5 GPa of pressure; 1400° C. of temperature; and 30 minutes of the retention time, to obtain the cBN sintered material of the cBN tool of the present invention.

Average layer thickness of the $Al_2O_3$ layer:

The average layer thickness of the $Al_2O_3$ layer coating the surface of the cBN particle (that is the $Al_2O_3$ layer in which the rift is formed partially) is needed to be 1-10 nm.

If the average layer thickness of the $Al_2O_3$ layer were less than 1 nm, the adhesive strength of the interface between the cBN particle and the binding phase such as titanium nitride or the like would be reduced and the toughness of the sintered material is reduced. Furthermore, the interface becomes tend to be the origin of cracking, reducing fracturing resistance. On the other hand, if the average layer thickness of the $Al_2O_3$ layer exceeded 10 nm, the tensile residual stress would be a large value in the $Al_2O_3$ layer on the surface of the cBN particle of the sintered material. Thus, cracking is like to occur in the interface between the surface of the cBN particle and the $Al_2O_3$ layer when it is used as a tool, reducing the chipping and fracturing resistances. In addition, the relative content ratio of the binding phase such as titanium nitride or the like is reduced and wear resistance is reduced.

Therefore, the average layer thickness of the $Al_2O_3$ layer coated on the surface of the cBN particle is set to 1-10 nm.

Partial Rift Formed in the $Al_2O_3$ Layer:

A partial rift is formed in the $Al_2O_3$ layer coated on the surface of the cBN particle. In the present specification, "the partial rift" is defined by the average rift formation ratio. That is, the surface of the cBN particle contacts the binding phase such as titanium nitride or the like in a practical way in the rift. This is the essential requirement for obtaining the technical effect of the present invention. More specifically, it is preferable that the rift is formed partially in such a way that the average rift formation ratio is 0.02-0.20.

If the average rift formation ratio were less than 0.02, it would lead to the state where the surface of the cBN particle is coated by the $Al_2O_3$ layer almost entirely. In this case, the residual tensile stress is generated in the $Al_2O_3$ layer, and cracks are tend to be formed in the interface between the cBN particle and the $Al_2O_3$ layer due to the synergic action of the intermittent and impacting load during the cutting work and the above-described residual tensile stress. On the other hand, if the average rift formation ratio exceeded 0.20, the ratio of the rift formation would be too high. In this case, the original technical effect that can be obtained by forming the $Al_2O_3$ layer coated on the surface of the cBN particle is weakened.

Thus, it is preferable that the average formation ratio of the rift formed in the $Al_2O_3$ layer coated on the cBN particle is set to 0.02-0.20.

Measurement Methods of the Average Rift Formation Ratio and the Average Layer Thickness of the $Al_2O_3$ Layer after Rift Formation:

For example, the formation ratio of the rift formed in the $Al_2O_3$ layer coated on the surface of the cBN particle can be calculated by the measurement method described below.

After polishing the cross section of the sintered material produced in the above-described process (IV), it is subjected to thin slicing and a transmission electron image is acquired by TEM in order to use for obtaining the average formation ratio of the rift formed in the $Al_2O_3$ layer.

A preferable thickness of the thin-sliced piece is 30 nm-130 nm. If the thickness were less than 30 nm, it would become difficult to handle. If it exceeded 130 nm, analysis of the image would be difficult. Therefore, these configurations are not preferable. The observed area is about 200 nm×200 nm. The magnification is set to an extent allowing observing the interface between the cBN particle and the binding phase.

Figure 2:
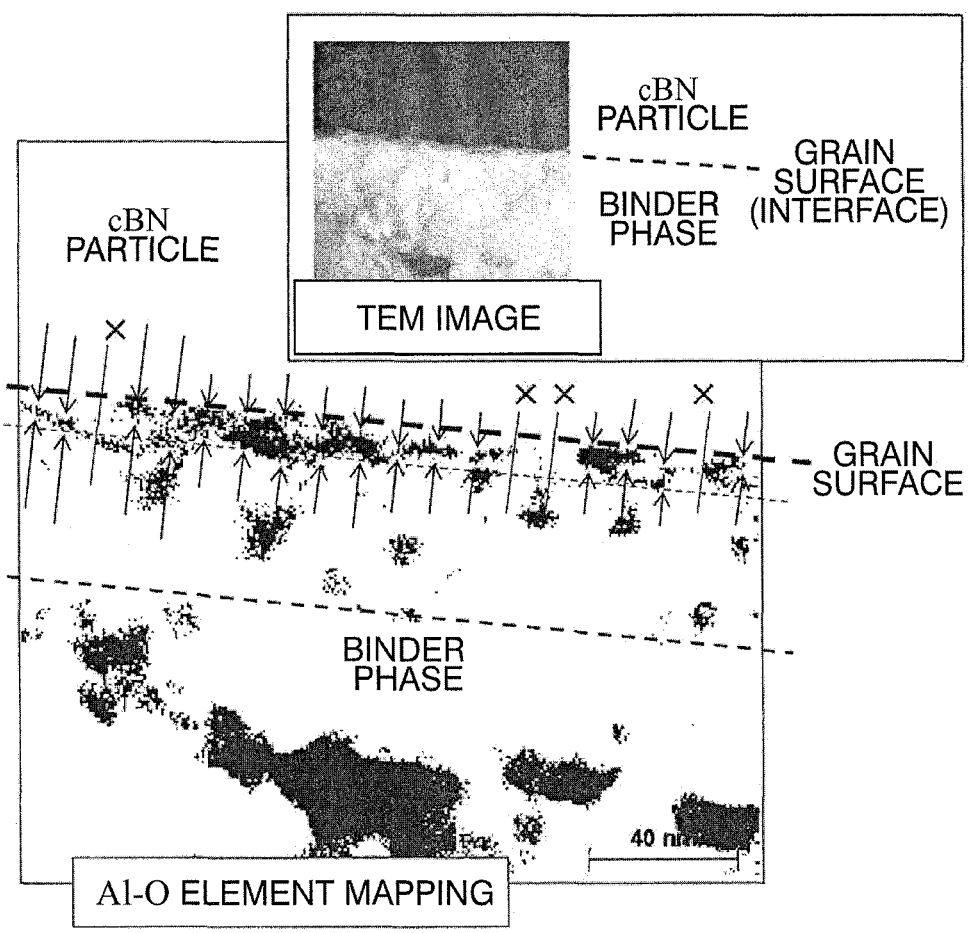
FIG. 2 is a cross-sectional image of the cBN particle including an $Al_2O_3$ layer, which was used for measurement of the rift formation ratio and had the average layer thickness of 3.9 nm.

FIGS. 1 and 2 show cross-sectional images of cBN particles with $Al_2O_3$ layers having different average layer thicknesses. FIG. 1 shows the TEM image used for measurement of the average formation ratio of the rift formed in the $Al_2O_3$ layer coated on the cBN particle with the $Al_2O_3$ layer having the average layer thickness of 6.0 nm. FIG. 2 shows the TEM image used for measurement of the average formation ratio of the rift formed in the $Al_2O_3$ layer coated on the cBN particle with the $Al_2O_3$ layer having the average layer thickness of 3.9 nm.

Elemental mapping is performed on the intermittent cross-sectional images obtained as described above by using a function of TEM. Then, the parts of: Al>5 atomic %; and O>5 atomic %, are binarized. Then, overlapping parts qualifying the both criteria at the same time indicated in black are defined as the $Al_2O_3$-existing region.

Then, cBN particles with observable interfaces with the binding phase are placed under further investigation. In the investigation, within the observed area of 200 nm×200 nm, the surface of the cBN particle is equally divided into 20 sections or more with the interval of 10 nm or less (the part indicated by "→←" in FIGS. 1 and 2). Then, the layer thicknesses of the $Al_2O_3$ layer at each location are measured, and the average layer thickness of the $Al_2O_3$ layer of the cBN particle is obtained by averaging these measured values.

In addition, the rift in the $Al_2O_3$ layer (for example, the parts indicated by "x" in FIGS. 1 and 2) is counted in at least 10 or more (i=1, 2 . . . ) of cBN particles. In the count, the sections corresponding to the rift in sections equally divided into at least 20 sections (the number of the equally divided sections $N_i$) are counted (the counted number $n_i$). Then, the ratio, which is the rift formation ratio $n_i/N_i$ in the cBN particle, is calculated. Then, the average rift formation ratio n/N is calculated from the average value of the above described counts.

The residual stress in the interface between the binding phase and the surface of the cBN particle can be loosened up by: using the cBN particles that are produced as described above and coated by the $Al_2O_3$ layer, in which the rift is partially formed, as the material raw powder for the hard phase component; and having the surface of the cBN particle contact the binding phase made of titanium nitride or the like in a practical way in the rift, in producing the cBN tool. Thus, chipping and fracturing resistances can be improved.

The cBN sintered material is produced by: using the cBN particles, which are produced as described above, and the binding phase component, such as the titanium nitride powder or the like, as the raw material powder for the binding phase formation; blending the both raw material powders to obtain the predetermined blend composition; and performing sintering under the standard ultra-high pressure and temperature condition.

As additional constituent in the cBN sintered material, the components normally included in the cBN sintered materials, such as nitrides, carbides, borides, oxides of the elements belonging to 4a, 5a, 6a groups in the periodic table and mutual solid solution thereof, can be mentioned. There is no reason for prohibiting inclusion of one or more selected from the above mentioned components.

Average Layer Thickness of the TiN Layer:

The TiN layer, which is formed on the surface of the cBN particle coated by the $Al_2O_3$ layer, functions as the component for formation of the binding phase during sintering; and reacts with the blended raw material powder for formation of the binding phase. The thicker the TiN layer, the harder the progress of the reaction with the raw material powder for formation of the binding phase in the vicinity of the cBN particles.

The average layer thickness of the TiN layer is not particularly limited in the present invention. However, it is preferable that the layer thickness of the TiN layer is set to 1-100 nm.

If the average diameter of the TiN layer were less than 10 nm, the function to suppress formation of $Al_2O_3$ irreversibly produced in the vicinity of the cBN particles during sintering is reduced. Thus, the $Al_2O_3$ amount is increased and the strength of the interface would be reduced. On the other hand, if the average diameter of the TiN layer exceeded 100 nm, the amount of $Al_2O_3$ irreversibly produced in the vicinity of the cBN particles would be reduced. However, in this case, the sintering reaction does not proceed sufficiently in the vicinity of the cBN particles and hardness of the cBN sintered material is reduced. Thus, cracks tend to be formed in the interface between the surface of the cBN particle and the TiN layer when it is used as a tool, and chipping and fracturing resistances are reduced.

Therefore, the average layer thickness of the TiN layer formed on the surface of the cBN particles as the outermost layer is set to 10-100 nm.

The average layer thickness of the TiN layer is calculated by: obtaining the layer thicknesses at 5 locations from an image in which the cross section of the cBN particle coated by the TiN layer is observed by using TEM; and averaging the values.

Total content of $Al_2O_3$ formed on the surface of the cBN particles and $Al_2O_3$ existing in the binding phase included in the region 50 nm from the surface of the cBN particles in the case where a volume of a region 50 nm from the surface of the cBN particles is defined as 100 volume %:

The $Al_2O_3$ amount irreversibly formed in the vicinity of the cBN particles can be adjusted by controlling the layer thickness of the TiN layer formed on the cBN particles. If the total amount of this amount and the $Al_2O_3$ amount formed on the surface of the cBN particle in advance exceeded 40 volume %, in the case where a volume of a region 50 nm from the surface of the cBN particles is defined as 100 volume %, the cBN holding force by the binding phase would be reduced. In this case, progress of fracturing due to detachment of cBN particles is stimulated. Therefore, the configuration is not preferable. If the total amount were 2 volume % or less, the sintering reaction in the vicinity of the cBN particles would not proceed sufficiently to reduce the hardness of the cBN sintered material. Thus, the total content of $Al_2O_3$ is set to 2 volume % or more.

In the measurement method of the total content of $Al_2O_3$ formed on the surface of the cBN particles and $Al_2O_3$ existing in the binding phase included in the region 50 nm from the surface of the cBN particles in the case where a volume of a region 50 nm from the surface of the cBN particles is defined as 100 volume %, it is measured by: observing the cross section of the cBN material in the viewing field of 200×200 nm by TEM; extracting parts of: Al>5 atomic %; and O>5 atomic %, measured by elemental mapping in TEM; binarizing the overlapped parts; and obtaining an image in which the overlapped regions are indicated in black. The total $Al_2O_3$ amount is obtained by: calculating the area ratio corresponding to the black region (the $Al_2O_3$-existing region), in which existence of Al and O overlaps in the image analysis in the region 50 nm from the surface of the cBN particle; and defining the ratio as the total content ratio (volume %) of $Al_2O_3$ formed on the surface of the cBN particle and $Al_2O_3$ existing in the binding phase.

The cBN tool of the present invention is explained in detail based on Examples below.

EXAMPLES

Producing cBN Particles as Raw Material Powder

Process (I):

A thin-filmed $Al_2O_3$ layer was formed using the cBN particles with the average grain size of 0.5-8 µm as the substrates by ALD method.

More specifically, the thin-filmed $Al_2O_3$ layer was formed on the surface of the cBN particle by: inserting cBN particles with the average grain size of 0.5-8 µm in the furnace; increasing temperature in the furnace to 350° C.; and repeating a cycle of: (1) Ar+$Al(CH_3)_3$ gas introducing process; (2) Ar gas purging process; (3) Ar+$H_2O$ gas introducing process; and (4) Ar gas purging process, using $Al(CH_3)_3$ gas, which was a precursor of Al, as the film deposition gas and $H_2O$ gas as the reaction gas in accordance with the intended layer thicknesses indicated in Table 1 (1-10 nm).

Process (II):

Next, a TiN layer was deposited on the $Al_2O_3$ layer formed on the surface of the cBN particle similarly by ALD method.

In order to form the TiN layer on the $Al_2O_3$ layer by ALD method, cBN particles were inserted in the furnace, and the temperature in the furnace was increased to 400° C. Then, a cycle of: (1) Ar+$TiCl_4$ gas introducing process; (2) Ar gas purging process; (3) Ar+$NH_3$ gas introducing process; and (4) Ar gas purging process, was repeated using $TiCl_4$ gas and $NH_3$ gas as raw material gases until the thickness of the TiN layer reached to the intended layer thickness (10-100 nm) to obtain the TiN layer with the intended layer thickness.

Process (III):

Next, the cBN particles 1-15 in which the surfaces of the cBN particles were exposed in the rift parts were produced by: blending the cBN particles, which the thin-filmed $Al_2O_3$ layer produced in the process (II) was formed on their surfaces and the TiN layer was further formed above the $Al_2O_3$ layer, and cemented carbide balls (diameter of 1 mm) so that their weight ratio became 1:10-1:20; inserting them in a container made of cemented carbide; performing the ball mill mixing in the condition of: the ball mill revolution of 50 rpm; and the mixing time of 0.25-3.0 hours, after adding an organic solvent to form the partial rifts in the $Al_2O_3$ layer.

In regard to the average layer thickness of the $Al_2O_3$ layer after the ball mill mixing and the average rift formation ratio in Table 1, values obtained based on the above-described calculation methods are shown. In the methods, the values were obtained from the sectional images obtained by TEM after producing the cBN sintered materials as described in detail above.

When the cBN particles, which were coated by $Al_2O_3$ layer obtained as explained above and subjected to the ball mill treatment after formation of the TiN layer on their outer layers, were observed by using TEM, it was confirmed that the rifts were formed partially in the $Al_2O_3$ layer.

TABLE 1

| No. | cBN (volume %) | Al₂O₃ layer thickness (nm) | Average rift formation ratio | Al₂O₃ within 50 nm range (volume %) | binding phase composition of sintered material |
|---|---|---|---|---|---|
| 1 | 60 | 1 | 0.04 | 2 | TiN, TiB$_2$, AlN, Al$_2$O$_3$ |
| 2 | 60 | 2.1 | 0.18 | 5 | TiN, TiB$_2$, AlN, Al$_2$O$_3$, WC |
| 3 | 60 | 4 | 0.20 | 12 | TiN, TiB$_2$, AlN, Al$_2$O$_3$ |
| 4 | 60 | 4.2 | 0.18 | 14 | TiN, TiCN, TiC, TiB$_2$, AlN, Al$_2$O$_3$, WC |
| 5 | 60 | 6 | 0.20 | 50 | TiN, TiCN, TiC, TiB$_2$, AlN, Al$_2$O$_3$, WC |
| 6 | 60 | 5 | 0.10 | 40 | TiN, TiB$_2$, AlN, Al$_2$O$_3$ |
| 7 | 60 | 5.1 | 0.20 | 15 | TiN, TiB$_2$, AlN, Al$_2$O$_3$, WC |
| 8 | 60 | 6.1 | 0.04 | 11 | TiN, TiB$_2$, AlN, Al$_2$O$_3$ |
| 9 | 60 | 8 | 0.02 | 15 | TiN, TiB$_2$, AlN, Al$_2$O$_3$ |
| 10 | 60 | 7.7 | 0.18 | 24 | TiN, TiCN, TiC, TiB$_2$, AlN, Al$_2$O$_3$, WC |
| 11 | 60 | 10 | 0.12 | 19 | TiN, TiB$_2$, AlN, Al$_2$O$_3$ |
| 12 | 60 | 7.9 | 0.12 | 58 | TiN, TiB$_2$, AlN, Al$_2$O$_3$ |
| 13 | 70 | 5 | 0.04 | 23 | TiN, TiB$_2$, AlN, Al$_2$O$_3$ |
| 14 | 50 | 3.4 | 0.06 | 45 | TiN, TiB$_2$, AlN, Al$_2$O$_3$ |
| 15 | 80 | 3 | 0.18 | 18 | TiN, TiB$_2$, AlN, Al$_2$O$_3$ |

Producing the cBN Sintered Material and the Insert:

Disc plates of the cBN sintered materials were obtained as explained below. As raw material powders, cBN particle powders 1-15 were prepared. In the cBN particle powders 1-15, the partial rift was formed in the Al$_2$O$_3$ layer produced as described above and the surface of the cBN particle was exposed in the rift part. Also, as raw material powders, the TiN powder; the TiC powder; the TiCN powder; the TiAl$_3$ powder; the Al powder; the Al$_2$O$_3$ powder; and the WC powder, each of which had the average grain size within the range of 0.3-0.9 µm, were prepared. Then, some of the raw material powders selected from the above-described raw material powders and the cBN particle powders were blended so that the content ratio of the cBN particle powder was 50-80 volume % in the case where the total amount of the blended raw material powders and the cBN particle powder was defined as 100 volume %. After blending, they were subjected to wet-mixing. Then, after drying, they were subjected to press molding into the dimension of: 50 mm of the diameter; and 1.5 mm of the thickness, at the molding pressure of 1 MPa by a hydraulic press. Then, the molded materials were subjected to the heat treatment in the condition of: vacuum atmosphere of 1 Pa or less of the pressure; 1000° C. of the temperature; and 30 minutes of the retention time to obtain the pre-sintered materials by removing the volatile components and the adsorbed components on the surfaces of the powders. Each of the pre-sintered materials was stacked with a separately prepared supporting piece made of WC-based cemented carbide and inserted into a standard ultra-high pressure sintering apparatus in the above-described stacked state. The supporting piece had the composition of: 8 mass % of Co; and the WC balance, and the dimension of: 50 mm of the diameter; and 2 mm of the thickness. Finally, the stacked materials were subjected to the ultra-high pressure and temperature sintering in the normal condition of: 5.5 GPa of the pressure; 1400° C. of the temperature; and 30 minutes of the retention time. By following the above explained procedures, the Disc plates of the cBN sintered materials were obtained. The cBN tools 1-15 of the present invention with the insert shape of ISO standard CNGA120408 were produced as explained below. The cBN sintered disc plates were sawed by a wire-electrical discharge machine into a predetermined dimension. Then, each of the sawn pieces was soldered on the soldering portion (corner part) of the main body of the insert made of WC-based cemented carbide, which had the composition of: 5 mass % of Co; 5 mass % of TaC; and the WC balance and the insert had the insert shape of ISO standard CNGA120408, using the Ag-base soldering material with the composition of: 26% of Cu; 5% of Ti; and the Ag balance. After soldering, the pieces were subjected to polishing on: the top and bottom surfaces; and outer periphery, and to the honing treatment. By following the above explained procedures, the cBN tools 1-15 of the present invention were obtained.

TABLE 2

| No. | cBN (volume %) | Al₂O₃ layer thickness (nm) | Average rift formation ratio | Al₂O₃ within 50 nm range (volume %) | binding phase composition of sintered material |
|---|---|---|---|---|---|
| 16 | 60 | 2 | 0.00 | 6 | TiN, TiB$_2$, AlN, Al$_2$O$_3$ |
| 17 | 60 | 1.8 | 0.40 | 6 | TiN, TiB$_2$, AlN, Al$_2$O$_3$ |
| 18 | 60 | 8.5 | 0.30 | 14 | TiN, TiB$_2$, AlN, Al$_2$O$_3$ |
| 19 | 60 | 10.8 | 0.00 | 35 | TiN, TiB$_2$, AlN, Al$_2$O$_3$ |
| 20 | 60 | 12 | 0.30 | 45 | TiN, TiCN, TiC, TiB$_2$, AlN, Al$_2$O$_3$ |
| 21 | 60 | 15 | 0.10 | 13 | TiN, TiCN, TiC, TiB$_2$, AlN, Al$_2$O$_3$ |
| 22 | 60 | 0 | — | 8 | TiN, TiB$_2$, AlN, Al$_2$O$_3$ |
| 23 | 60 | 19 | 0.18 | 60 | TiN, TiB$_2$, AlN, Al$_2$O$_3$ |
| 24 | 60 | 22 | 0.25 | 23 | TiN, TiB$_2$, AlN, Al$_2$O$_3$, WC |
| 25 | 60 | 60 | 0.00 | 100 | TiN, TiB$_2$, AlN, Al$_2$O$_3$ |
| 26 | 60 | 0 | — | 1 | TiN, TiB$_2$, AlN, Al$_2$O$_3$ |

TABLE 2-continued

| No. | cBN (volume %) | Al$_2$O$_3$ layer thickness (nm) | Average rift formation ratio | Al$_2$O$_3$ within 50 nm range (volume %) | binding phase composition of sintered material |
|---|---|---|---|---|---|
| 27 | 45 | 5 | 0.12 | 20 | TiN, TiB$_2$, AlN, Al$_2$O$_3$ |
| 28 | 85 | 2 | 0.10 | 12 | TiN, TiB$_2$, AlN, Al$_2$O$_3$ |

For comparison, cBN particle powders, on which Al$_2$O$_3$ layers were not formed; and cBN particle powders, on which Al$_2$O$_3$ layers with average layer thickness that were out of range in the configuration of the present invention were formed, were prepared as raw material powders. In addition, for the cBN particle powders in which the TiN layer was not formed on the Al$_2$O$_3$ layer, the cBN particle powders 16-28 as shown in Table 2 were prepared. Also, as raw material powders, the TiN powder; the TiC powder; the TiCN powder; the TiAl$_3$ powder; the Al powder; the Al$_2$O$_3$ powder; and the WC powder, each of which had the average grain size within the range of 0.3-0.9 µm, were prepared. Then, some of the raw material powders selected from the above-described raw material powders and the cBN particle powders were blended so that the content ratio of the cBN particle powder was 45-82 volume % in the case where the total amount of the blended raw material powders and the eBN particle powder was defined as 100 volume %. After the blending, the blended materials were subjected to the same treatment operations (drying, molding, heat treating, pre-sintering, sintering, and the like) as in the case of Example of the present invention to produce the cBN tools 16-28 of Comparative Example.

The compositions of the sintered materials in Tables 1 and 2 were determined by elemental mapping of TEM and XRD (X-ray Diffraction) on the cross sections of the cBN sintered materials.

Using the above-described cBN tools 1-15 of the present invention and the cutting tools 16-28 of Comparative Example, cutting test was performed in the cutting condition indicated below.

Work: φ100 mm round rod with 4 slits along the axis direction made of case hardened steel SCM415 (HRC=58-62)
Cutting speed: 150 m/min
Cutting depth: 0.2 mm
Feed rate: 0.1 mm/rev
Cutting oil: dry The maximum cutting length was set to 2.5 km. Presence or absence of chipping and fracturing at the cutting edge was checked every 0.1 km of the cutting length.

Results in the cutting test are shown in Tables 3 and 4.

TABLE 3

| No. | Status of cutting edge in 2.5 km cutting |
|---|---|
| 1 | No chipping, No fracturing |
| 2 | No chipping, No fracturing |
| 3 | No chipping, No fracturing |
| 4 | No chipping, No fracturing |
| 5 | Chipping at cutting length of 2.4 km |
| 6 | No chipping, No fracturing |
| 7 | No chipping, No fracturing |
| 8 | No chipping, No fracturing |
| 9 | No chipping, No fracturing |
| 10 | No chipping, No fracturing |
| 11 | No chipping, No fracturing |
| 12 | Chipping at cutting length of 2.4 km |
| 13 | No chipping, No fracturing |
| 14 | Chipping at cutting length of 2.3 km |
| 15 | No chipping, No fracturing |

TABLE 4

| No. | Status of cutting edge in 2.5 km cutting |
|---|---|
| 16 | Fracturing at the cutting length of 1.1 km |
| 17 | Fracturing at the cutting length of 1.7 km |
| 18 | Chipping at cutting length of 1.6 km |
| 19 | Chipping at cutting length of 2.4 km |
| 20 | Fracturing at the cutting length of 1.6 km |
| 21 | Chipping at cutting length of 1.5 km |
| 22 | Fracturing at the cutting length of 0.5 km |
| 23 | Fracturing at the cutting length of 1.4 km |
| 24 | Chipping at cutting length of 1.8 km |
| 25 | Fracturing at the cutting length of 1.2 km |
| 26 | Fracturing at the cutting length of 0.4 km |
| 27 | Chipping at cutting length of 1.6 km |
| 28 | Fracturing at the cutting length of 0.7 km |

Based on the results shown in Tables 1-4, the following was demonstrated. In the cutting tools 1-15 of the present invention, the cBN hard phase was uniformly distributed in the sintered material and homogeneous tool characteristics were obtained by performing sintering using the cBN particles on which the Al$_2$O$_3$ layer with the rift on the surface of the cBN particles partially and the TiN layer were formed. In these cBN cutting tools 1-15 of the present invention, the adhesiveness strength of the interface between the cBN hard phase and the binding phase was improved. Furthermore, the residual tensile stress formed in the Al$_2$O$_3$ layer, in which the rifts were formed partially, was significantly reduced compared to one without the rift. Because of the reasons described above, chipping and fracturing were suppressed in the cBN cutting tools 1-15 of the present invention even if they were used in the intermittent cutting work of high hardened steel, in which intermittent and impacting load was applied to them. Furthermore, in the cBN tools 1-15 of the present invention, formation of Al$_2$O$_3$ in the vicinity of the cBN particles was suppressed since sintering was performed in the state where the cBN particles were coated by the TiN layers. Because of these results, the cBN cutting tools 1-15 of the present invention exhibited the excellent cutting performance for the long term usage.

Contrary to that, in the cBN tools 16-28 of Comparative Example, chipping and fracturing resistances were poor and their tool lives were short lived, since the Al$_2$O$_3$ layer with the rift or the TiN layer were not formed on the surface of the cBN particles, or the average layer thickness of the Al$_2$O$_3$ layer was out of the range defined in the configuration of the present invention.

INDUSTRIAL APPLICABILITY

The cBN tool of the present invention has excellent chipping and fracturing resistances and is applicable even in the cutting condition other than the intermittent cutting of the high hardened steel. Thus, the cBN tool of the present invention can contribute sufficiently to improvement of the performance of the cutting work apparatus; and labor-saving, energy-saving, and reduction of the cost of cutting work.

The invention claimed is:

1. A cutting tool made of a cubic boron nitride-based sintered material comprising:
    a cutting tool body that is a cubic boron nitride-based material containing at least cubic boron nitride particles as a hard phase component, wherein
    each of the cubic boron nitride particles comprises an $Al_2O_3$ layer with an average layer thickness of 1.0-10 nm on a surface of the each of the cubic boron nitride particles, a rift with an average rift formation ratio of 0.02-0.20 being formed in the $Al_2O_3$ layer, and
    the cubic boron nitride-based sintered material comprises a binding phase containing at least one selected from a group consisting of: titanium nitride; titanium carbide; titanium carbonitride; titanium boride; aluminum nitride; aluminum oxide; inevitable products; and mutual solid solution thereof, around the each of cubic boron nitride particles.

2. The cutting tool made of a cubic boron nitride-based material according to claim 1, wherein in a case where a volume of a region 50 nm from the surface of the each of the cubic boron nitride particles toward an outside of the each of the cubic boron nitride particles is defined as 100 volume %, a total content of $Al_2O_3$ formed on the surface of the each of the cubic boron nitride particles and $Al_2O_3$ existing in the binding phase included in the region is 2-40 volume %.

3. The cutting tool made of a cubic boron nitride-based material according to claim 1, wherein an average grain size of the cubic boron nitride particles is 0.5-8 μm.

4. The cutting tool made of a cubic boron nitride-based material according to claim 1, wherein a TiN layer with an average layer thickness of 10-100 nm is formed on the $Al_2O_3$ layer.

5. The cutting tool made of a cubic boron nitride-based material according to claim 1, wherein
    the rift formed in the $Al_2O_3$ layer is formed by: inserting the cubic boron nitride particles, on each of which the $Al_2O_3$ layer is formed, in a container made of cemented carbide; and performing ball-mill mixing in a presence of cemented carbide balls.

6. The cutting tool made of a cubic boron nitride-based material according to claim 1, wherein a content ratio of the cubic boron nitride particles relative to an entire cubic boron nitride-based sintered material is 50-80 volume %.

* * * * *